April 2, 1946.　　　H. G. BUSIGNIES ET AL　　　2,397,531
RADIO BEACON SYSTEM
Filed June 26, 1944　　　3 Sheets-Sheet 3
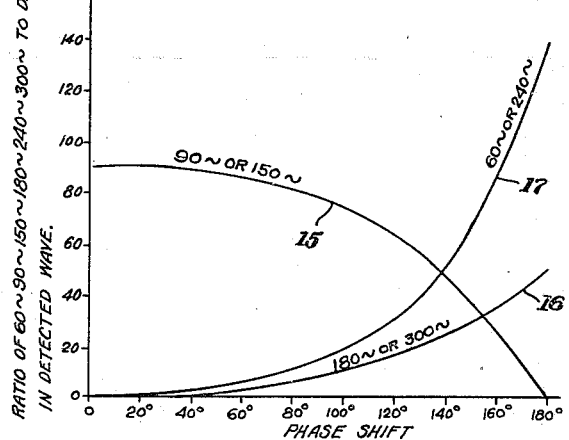
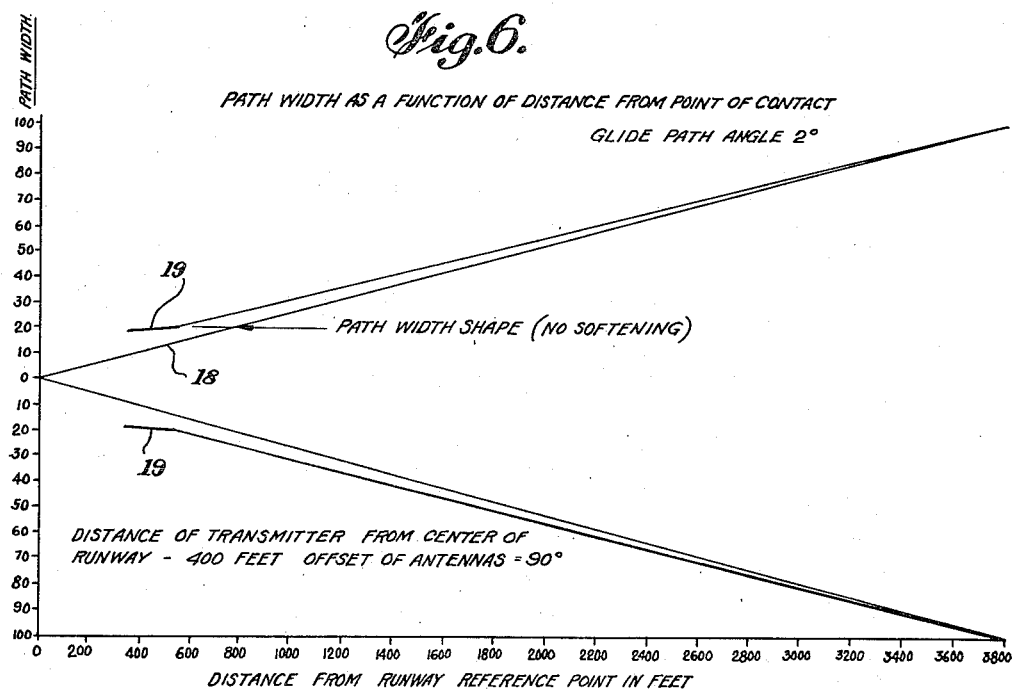
INVENTORS
HENRI G. BUSIGNIES
SIDNEY B. PICKLES
BY
*R. P. Morris*
ATTORNEY Patented Apr. 2, 1946

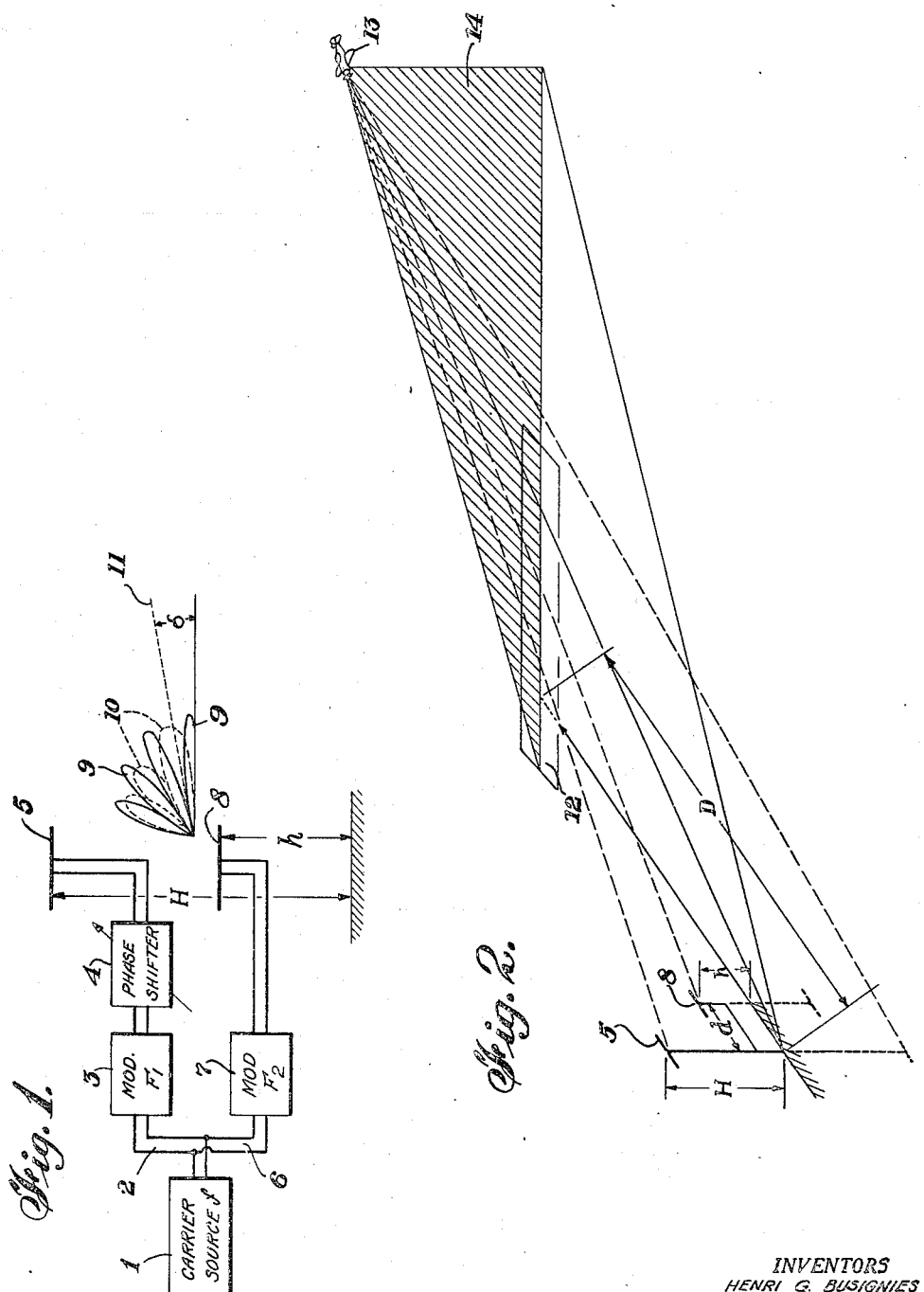

2,397,531

UNITED STATES PATENT OFFICE 2,397,531

RADIO BEACON SYSTEM

Henri G. Busignies, Forest Hills, and Sidney B. Pickles, Jackson Heights, N. Y., assignors to Federal Telephone and Radio Corporation, New York, N. Y., a corporation of Delaware Application June 26, 1944, Serial No. 542,118

8 Claims. (Cl. 250—11)

This invention relates to radio beacons and more particularly to systems for controlling the sharpness of courses defined by radio beacons.

In radio guiding beacons, particularly those designed to define an equi-signal glide path at a predetermined angle to the ground for the purpose of guiding aircraft to a landing, an inherent phase shift occurs in the carrier frequencies of the overlapping beacon patterns as the aircraft approaches a landing. This phase shift is caused by reason of the fact that the radiation patterns for each antenna are produced by the interacting effect of the antenna spaced above the surface of the earth and its image located below the earth at an equal distance to the vertical spacing. The craft, therefore, cannot approach along a line of equality between the antennas since that would be on the surface of the earth. Furthermore, in order to provide the two vertically interacting patterns, it is necessary that one of the radiators be spaced above the earth a different distance than the other, so that a relative phase displacement occurs in the carrier frequencies radiated from the two antennas.

It is an object of our invention to provide a system and method for controlling the effective phase shift along a guiding course of the carrier frequency from two radiated beacon patterns.

It is a further object of our invention to provide a glide path system wherein the desired phase control and consequent sharpness of the guiding pattern is effected by properly phasing the energy radiated from first and second radiators providing the glide path indications.

It is a still further object of our invention to provide in an equi-signal glide path system, a construction which will provide for a relative softening, or reduction in sharpness, of the glide path course as the craft approaches a landing.

According to a feature of our invention, a pair of vertically spaced radiators are provided for radiating a common carrier frequency modulated with different signal frequencies. The radiators are vertically spaced one above the other at different distances above the earth, to provide patterns overlapping in the vertical plane. The phasing of the radio frequency supplied to the antennas is preferably adjusted so that at a great distance from the beacon, that is at a distance which for practical purposes may be considered infinite, the radio frequency energy from the two patterns is in phase. As a consequence of the spacing between the antennas, a relative phase shift in the carrier energy occurs as the craft approaches the beacon. In order to control the amount of phase shift produced, the upper radiating unit may be displaced laterally, with respect to the guiding course and the lower antenna, with respect to the course to control the effective phase shift. By moving the upper antenna further away from the course, a greater phase shift and a consequent greater softening of the landing beacon indication is provided. On the other hand, moving the upper antenna closer to the course tends to reduce the phase shift and consequently maintain the sharpness of the course as the landing is approached.

A better understanding of our invention and the objects and features thereof may be had by reference to the particular description of specific embodiments thereof made with reference to the accompanying drawings in which:

Fig. 1 is a block circuit diagram illustrating a radio beacon of the type to which the principles of our invention may be applied;

Fig. 2 is a diagrammatic illustration of an airway landing strip and radio beacon installation, in accordance with the principles of our invention;

Fig. 5 is a graph illustrating the reduction in signal strength of the desired audio signals accompanying a phase shift in the carrier energy of two intersecting patterns; and Fig. 6 is a diagram illustrating the softening or reduction in sharpness of a beacon course caused by relative carrier phase shift.

Figure 3:
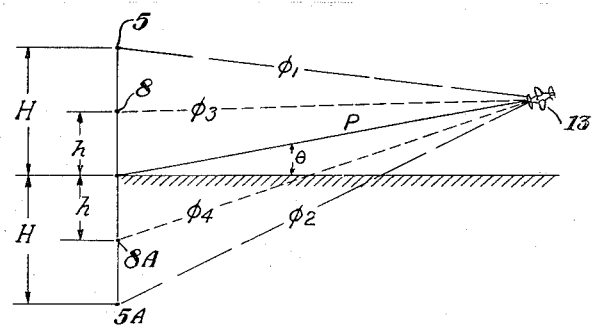
Figs. 3 and 4 are diagrams used to explain the features of our invention.

Turning first to Fig. 1, there is illustrated a typical glide path beacon arrangement comprising a source 1 of carrier frequency $f$, coupled over a branch line 2, to a first modulator 3, for modulating the carrier frequency with a first signal F1. This modulated signal may be applied over adjustable phase shifter 4, to a first radiator 5, located above the earth, a distance H. A second branch 6, from the output of source 1, applies carrier frequency $f$ to modulator 7, wherein the energy is modulated with a second distinctive signal F2. The second modulated signal is then applied to a second radiator 8, spaced above the earth a distance $h$. Preferably H is made to be a multiple of $h$, so that H may be said to be equal to $nh$. Upper radiator 5, by reson of its vertical spacing, produces a multiple radiation pattern 9, illustrated in the solid lines. Radiator 5 must be located at a sufficiently high distance above the surface of the earth so that the lower lobe of pattern 9 is close to the surface of the earth, so that a glide path at a desired angle may be obtained. Radiator 8, spaced closer to the earth surface, produces a second multilobe pattern 10, the lower lobe of which overlaps the lower lobe of pattern 9 to produce an equisignal zone or line 11, defining the desired glide path angle. In the preferred form of glide path beacon the radiators 5 and 8 are both spaced laterally with respect to a landing runway to produce a substantially hyperbolic shaped landing glide path beacon, as it is described in a patent to Andrew Alford, No. 2,294,882, issued September 8, 1942.

In Fig. 2, we have illustrated a typical glide path beacon arrangement incorporating the principles of our invention. As shown herein, antennas 5 and 8, providing the desired glide path beacon, are spaced from a landing runway 12 by a distance D. Likewise, antenna 8 is laterally displaced closer to runway 12 by an amount d. An aircraft 13 follows the glide path beacon indication to runway 12 in plane 14. It will be readily seen that with the system as shown in Fig. 2, a relative phase shift in the carrier frequency energy radiated from antennas 8 and 5 will occur as the craft approaches a landing due to the vertical displacement between antennas 5 and 8, and further due to horizontal displacement between these antennas.

Turning now to Figure 3, an explanation of the phase displacement caused by the vertical spacing of antennas 5 and 8, will be given. This displacement is calculated independently of the further phase displacement caused by the horizontally lateral displacement of the antennas. It will be noted that the aircraft 13, at any distance P from the beacon, will receive energy with a phase $\phi_1$ from radiator 5 and other energy of phase $\phi_2$ from the effective image radiator 5A.

Similarly, from radiator 8 the craft will receive energy over the line representing a phase relationship $\phi_3$ and further energy of phase $\phi_4$ from the image radiator 8A. The phase of the carrier frequency energy represented by the pattern 9 from antenna 5, carrying signal energy F1, may be expressed by the following equation:

(1) $$\phi_{F1} = P + \frac{1}{2}\left(\frac{H}{P}\right)^2$$

The corresponding phase relation of energy from antenna 8 represented by pattern 10, may be expressed by the following (2) $$\phi_{F2} = P + \frac{1}{2}\left(\frac{h}{P}\right)^2$$

The phase difference between the resultant carriers from the upper and lower antennas on any point along the glide path is equal to the phase difference between signals F1 and F2.

(3) $$\phi_{T'} = \phi_{F1} - \phi_{F2} = \frac{H^2 - h^2}{2P}$$

in which $\phi_{T'}$ equals the total phase shifting caused by the vertical displacement of the antennas. However $H = nh$, so this expression may be written as follows:

(4) $$\phi_{T'} = h^2 \frac{(N^2 - 1)}{2P}$$

Since the distance P is the only variable in this final equation, it can be seen that the phase shift as the aircraft approaches the antennas varies inversely with P.

Figure 4:
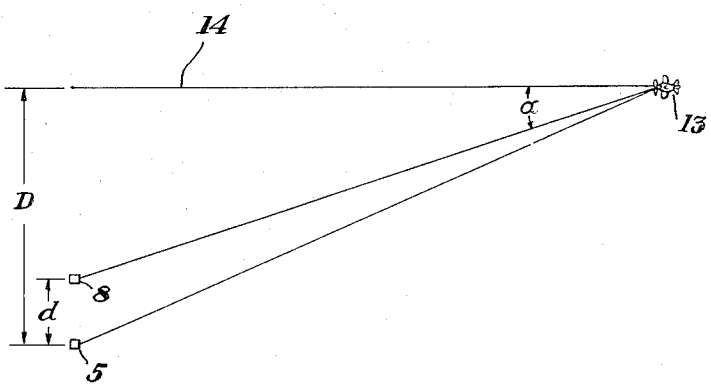

If antenna 5 is moved further away from the runway 12, then a further phase shift will be produced since antenna 5 will be still further away from the plane 14 which the aircraft follows, producing an increased phase shift as the aircraft approaches a landing. This fact may be more readily understood by reference to Fig. 4, showing the lateral displacement of these units. This additional phase shift may be calculated by means of the following equation:

(5) $$\phi = d \sin \alpha$$

where $\alpha$ represents the horizontal angular displacement of the antenna. The total phase shift $\phi_T$ may then be expressed by the following:

(6) $$\phi_T = \frac{h^2(n^2 - 1)}{2P} + d \sin \alpha$$

This phase shift, however, is a function of two variables; namely, P and $\alpha$. It is desirable to express this phase shift as the function of a single variable. This may be readily done since $$P = \frac{D}{\sin \alpha}$$

which when substituted in Equation 6 gives the following result:

(7) $$\phi_T = \frac{h^2(n^2 - 1)}{2(D)} \sin \alpha + d \sin \alpha$$

It can, therefore, be seen that the phase shift occurring as the aircraft approaches the landing may be readily calculated from the formulas given above for any desired glide path angle. It being merely necessary to insert the constants representing the height of the antennas above the earth and the fixed spacings of the units in order to complete the calculations.

Should it be desired to compensate the phase shift caused by the vertical spacing of the antenna units, then antenna 5 should be spaced closer to runway 12 than antenna 8 and the phase shift calculated for the horizontal displacement may be subtracted from that caused by the vertical displacement. It will thus be seen that in accordance with our invention, an effective control of phase shift between the carrier of the separate signals as an aircraft approaches a landing, may be had.

It will be understood that the signal output at the receiver tends to decrease with increase of phase shift between the carriers. Thus the increased amount of phase shift will produce a softening of the glide path as the craft approaches a landing. This may be desirable in many cases since the inherent increase in sharpness of course indications as an aircraft approaches the beacon tends to make the indicator too sensitive to slight deviations from course. It is, therefore, considered that in general the softening action obtainable in accordance with our invention will be preferable to the compensation of phase shift.

In Fig. 5, is shown a set of curves illustrating how signal strengths decrease with increase of carrier phase shift. Signals F1 and F2, which may be 90 and 150 cycle signals, are shown at 90 representing a percentage modulation when the phase shift is zero, but reduced in amplitude to zero at the point where the phase shift between the carrier energy reaches 180°, as shown in curve 15. At the same time the consequent harmonic content increases, as shown in curve 16 and the cross modulation or beating of signals also increases, as shown in curve 17. These combined effects produce considerable softening effect on the glide path indication. Without any phase shift in the carrier energy, the glide path will approach a sharp point, as shown by curve 18 of Fig. 6. However, with the phase shifting to provide the softening of the course, the glide path pattern will not come to a point, as shown in curve 18, but will tend to branch off providing a much more gradual increase in signal strength as the beacon is approached, as shown by curve 19 of Fig. 6.

While we have described our invention in connection with glide path beacons, to which it is particularly adapted, it should be distinctly understood that the principles thereof are not limited to this type of beacons. The control of phase displacement of carrier frequency energy as the craft approaches a radio beacon may be applied likewise to localizer beacons in case the sharpness of such beacons need further control. Furthermore, the specific example described in connection with the particular description is not to be considered as a limitation on our invention as set forth in the objects thereof and in the accompanying claims.

We claim:

1. A beacon for defining a radio guiding course, comprising a first radiator for radiating radio frequency energy modulated with a first signal over a predetermined pattern, a second radiator spaced vertically from said radiator for radiating said radio frequency energy modulated with a second signal over a second pattern overlapping said first pattern, said radiators being assymetrically spaced with respect to said course, means for phasing the radio frequency energy from said radiators to provide a cophasal relation thereof at a predetermined distance from said beacon along said course and an inherent increasing phase shift as said beacon is approached along said course, said first and second radiators having a predetermined horizontal spacing transversely of said course to provide a further phase control serving to modify said inherent phase shift.

2. A beacon for defining a radio guiding course in which the sharpness of the course is diminished as the beacon is approached, comprising a first radiator for radiating at a predetermined radio frequency a first signal providing a predetermined radiation pattern, a second radiator spaced from said first radiator for radiating at said predetermined radio frequency, a second signal providing a pattern overlapping said predetermined pattern to define said course line, and means for phasing the radio frequency carrier supplied to said first and second radiators so that at a predetermined point adjacent said beacon, the carrier frequencies from said radiators have a given phase shift with respect to one another, the phase shift of said carrier frequencies decreasing progressively with respect to one another upon departure from said predetermined point adjacent said beacon along said course.

3. A beacon according to claim 2, wherein said radiators are spaced vertically with respect to one another.

4. A beacon according to claim 2, wherein said radiators are spaced laterally with respect to one another.

5. A beacon according to claim 2 wherein said radiators are spaced vertically and laterally with respect to one another.

6. A radio beacon for defining a glide path to guide aircraft to a point on a landing runway, comprising a first radiator spaced laterally from said landing runway, a second radiator spaced vertically with respect to said first antenna and laterally from said runway a different distance than said first radiator, means for supplying radio frequency energy modulated with a first signal to said first radiator to produce a radiation pattern overlying said runway and having a predetermined directive distribution in a vertical plane, means for supplying said radio frequency energy modulated with a different second signal to said second radiator to provide a second radiation pattern overlying said runway and having a directive distribution in a vertical plane to provide an intersecting zone with said first radiation pattern defining a landing line, and means for phasing the energy supplied to said first and second radiators to provide substantial phase coincidence of said radio frequency at a relatively great distance along said course from said beacon.

7. A beacon according to claim 6, wherein said first radiator is spaced above said second radiator and further from said landing runway, whereby a predetermined phase displacement increasing as said beacon is approached as a function of said vertical and horizontal spacing is provided to produce an effective softening of said glide path upon approach to said landing point.

8. A beacon according to claim 6, wherein said first radiator is spaced above said second radiator inherently tending to produce a phase shift increasing as said landing point is approached, and said first radiator is spaced closer to said runway than said second radiator, providing an inherent phase shift tending to compensate said phase shift first named.

HENRI G. BUSIGNIES.
SIDNEY B. PICKLES.